United States Patent Office 3,062,890
Patented Nov. 6, 1962

3,062,890
ALPHA-HYDROXY BETA-MERCAPTOALKANALS
George B. Payne, Berkeley, William J. Sullivan, Oakland, Paul R. Van Ess, Berkeley, and Paul H. Williams, Orinda, Calif., assignors to Shell Oil Company, a corporation of Delaware
No Drawing. Filed Nov. 10, 1958, Ser. No. 772,711
3 Claims. (Cl. 260—602)

This invention relates to novel substituted alkanals and to a process for preparing them. More specifically, the invention relates to alpha-hydroxy-beta-substituted alkanals and to their preparation from 2,3-epoxyalkanals. Still more specifically, the invention relates to a process for selectively reacting 2,3-epoxyalkanals in such a manner that only the oxirane ring is opened and the formyl group remains intact. The invention further relates to novel alpha-hydroxy-beta-substituted alkanals so produced.

In general, substituted alkanals have been prepared by reacting such bifunctional aldehydes as acrolein under precisely controlled conditions. In this way, reactions may proceed at one active site and not the other, and the formyl group may be retained intact. For example, the reaction between acrolein and hydrogen chloride gives 3-chloropropionaldehyde; alcohols similarly react to give the 3-alkoxypropionaldehydes; and mercaptans afford the 3-mercaptopropionaldehydes. It is difficult, if not impossible, to prepare the corresponding lactaldehydes from either acrolein or these derivatives.

We have found, however, that by using certain derivatives of such unsautrated aldehydes as acrolein and crotonaldehyde, it is possible to prepare novel polyfunctional aldehydes which have reactive substituents on both the alpha and beta carbon atoms relative to the formyl group. These new compounds, alpha,beta-disubstituted alkanals, have one more reactive group than do the derivatives produced by reactions of unsaturated aldehydes and are therefore capable of a variety of reactions to produce useful compounds.

For example, the novel substituted alkanals may be condensed with amines to yield substituted secondary alkanolamines, useful as detergents and cleansers. The alkanals may also be oxidized to the corresponding alpha,beta-disubstituted aliphatic carboxylic acids which by virtue of their possession of both the hydroxyl and carboxylic groups, may be reacted with either alcohols or other carboxylic acids to yield novel resinous polyesters. The alkanals also undergo the characteristic addition of sodium bisulfite to yield bisulfite addition compounds whose hydroxyl groups may in turn be reacted with fatty acids to yield useful detergent-type compounds. If the beta-substituent is olefinic, the alkanals are capable of polymerization in three ways: through the unsaturated bond of the beta-substituent; through the esterification of the alpha-hydroxyl group; or by polymerization through the formyl group. By controlling the reactions at each of these sites, a variety of polymers of differing characteristics may be produced. It will thus be seen that the alpha,beta-disubstituted alkanals of our invention are useful as intermediates in the preparation of monomers, resins, detergents and the like.

It is therefore an object of this invention to provide novel alpha,beta-disubstituted alkanals, as well as a process for preparing such compounds from derivatives of 2,3-unsaturated aldehydes. Another object of the invention is the provision of such novel alkanals having a hydroxyl group in the alpha position. A still further object of the invention is to provide a process for quickly and easily preparing alpha-hydroxy-beta-substituted alkanals from 2,3-epoxyalkanals. A process whereby the oxirane ring of an epoxyalkanal is selectively reacted while the formyl group remains intact is another object of the invention. Still a further object of the invention is the provision both of a process for the synthesis of novel beta-substituted lactaldehydes and of the beta-substituted lactaldehydes themselves. Other objects of the invention will be apparent from the following discussion of the invention.

All of these objects are accomplished in our invention by a process which comprises reacting a 2,3-epoxyalkanal with a compound having the formula HX, wherein the H is an acidic hydrogen atom, X is a negative radical containing at least one atom of the group consisting of halogens and non-metallic chalcogens, said atom being connected directly to the acidic hydrogen atom, and wherein the non-metallic chalcogen is so connected in a linkage selected from the group consisting of ether and ester linkages; and recovering as a product an alpha-hydroxy-beta-X-alkanal. Examples of compounds having the required characteristics for the compound HX are such inorganic compounds as hydrogen halides and hydrogen sulfide, and such organic compounds as the carboxylic acids, alkanols, and phenols. In this way, the novel alpha-hydroxy-beta-X-alkanals, such as the beta-substituted lactaldehydes, can readily be prepared in good yield.

Of particular interest as alpha-hydroxyalkanals are the lactaldehydes, the 3-carbon atom aldehydes having a hydroxyl substituent on the alpha-carbon atom relative to the carbonyl group. They are so termed herein because of their formal similarity to lactic acid, alpha-hydroxypropionic acid. Lactic acid is a chemical intermediate of considerable utility by virtue of its bifunctionality and availability; see, for example, Fisher and Filachione, Lactic Acid—Versatile Intermediate for the Chemical Industry, AIC–178, U.S. Department of Agriculture, May 1948. Lactaldehydes have not, however, been derived from lactic acid, but have instead been synthesized from acrolein by reaction at the double bond.

Our invention can be best understood by a consideration of the process by which the new compounds are prepared. As noted above, the starting materials for the preparation of the alpha-hydroxy-beta-substituted alkanals are 2,3-epoxyalkanals. These compounds have a very reactive epoxy group activated by the carbonyl group. The 2,3-epoxyalkanls are characterized by their possession of the reactive epoxy or oxirane group,

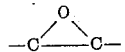

wherein the epoxy oxygen atom is attached to carbon atoms alpha and beta to the formyl or —CHO group on the molecule. They are conveniently afforded by epoxidation of the olefinic linkage of 2,3-unsaturated alkanals such as acrolein, methacrolein, crotonaldehyde, 2-pentenal, tiglic aldehyde, and the like.

Representative 2,3-epoxyalkanals are 2,3-epoxypentanal, 2,3-epoxyhexanal, 2,3-epoxyoctanal, 2,3-epoxyisopentanal, 1-formyl-1,2-epoxycyclopentanal, and the like. Of these compounds, the alpha,beta-monoepoxyalkanals having from 3 to 8 carbon atoms are preferred because of their lower expense and greater reactivity and because of the desirable nature of the resulting products. Most preferred, because of its considerable reactivity, is 2,3-epoxypropanal, prepared by epoxidation of acrolein. The high reactivity of this compound stems from the fact that the oxirane group is both in the terminal position and is activated by the formyl group.

The substituted aldehydes of this invention result from the reaction of the 2,3-epoxyalkanals noted with compounds having the general formula HX where the H is an acidic hydrogen atom, and X is a negative radical containing at least one atom selected from the group consisting of halogens and non-metallic chalcogens, said atom being connected directly to the acidic hydrogen atom, and wherein the non-metallic chalcogen is so connected by a linkage selected from ether and ester linkages. The compounds designated in this manner are those compounds which are known to open epoxy rings but which in our invention are capable of doing so without reacting with the formyl group of the epoxyalkanal. By acidic hydrogen we mean those hydrogen atoms which can, for example, be determined by methyl magnesium iodide in the Zerewitinoff method.

The non-metallic chalcogens are oxygen and sulfur, the other members tellurium, selenium and polonium having metallic properties. By ether linkages we mean to designate those wherein the non-metallic chalcogen atoms are directly attached to hydrogen or hydrocarbyl radicals; while in ester linkages they are attached at one bond to an acyl group

where R is hydrocarbyl. If the non-metallic chalcogens are designated by the notation —Z—, the ester may thus be shown as

while the ether linkage may be represented R—Z—.

Compounds which will open epoxy rings and whose formula is defined by HX include the hydrogen halides HCl, HBr, HI and HF. Also included are organic compounds having the formula ROH, wherein R may be either acyl or hydrocarbyl, and preferably contains up to 20 carbon atoms. For example, when R is acyl, it may be represented by the structure

where R' is a hydrocarbyl radical corresponding to R but having one less carbon atom. The radicals designated by R and R' include those hydrocarbon radicals having as substituents functional groups which include carbonylic or etheric oxygen, halides, amino and nitro groups which are less reactive with the epoxy ring than the carboxylic or alcoholic hydroxylic hydrogen. In such instances, the compound HX designates monocarboxylic acids. Illustrative organic carboxylic acids are formic acid, acetic acid, propionic acid, butyric acid, pivalic acid, acrylic acid, methacrylic acid, vinylacetic acid, valeric acid, and the like. Also operative, of course, are substituted acids such as the halosubstituted acids fluoroacetic, dichloroacetic, beta-chloropropionic and similar acids.

When HX designates compounds having the formula ROH where R is hydrocarbyl and has preferably up to 20 carbon atoms, it may thus represent lower acyclic hydrocarbinols such as the saturated alkanols, methanol, ethanol, propanol, isopropanol, butanol, tert-butanol, hexanol, octanol and decanol; or when R is unsaturated it may designate such compounds as allyl alcohol, methallyl alcohol, crotyl alcohol, octene-1-ol, oleyl, lauryl, etc. Alcohols having more than one hydroxyl group in the aliphatic chain, such as glycols, glycerin, and the like, are also operative.

By ROH we also mean to designate cyclic compounds, particularly such mononuclear hydroxyaryl compounds as phenol, ethyl phenol, the cresols, the xylenols, benzyl alcohol, and durenol, and such cycloaliphatic carbinol compounds as cyclohexanol, cyclopentanol, and cyclopropanol. Mononuclear polyhydroxybenzenes, such as resorcinol, ethyl resorcinol, pyrogallol and catechol are also useful as reactants in our process.

Another class of compounds meeting these requirements is that class of acidic compounds containing the radical —SH, such as hydrogen sulfide and organic thioacids having the formula

where R is hydrocarbyl or substituted hydrocarbyl and contains up to 20 carbon atoms. Of these sulfur compounds, the most preferred is hydrogen sulfide, which is inexpensive, gives extremely useful products and, because it is a gas under most conditions of use, is the most easily employed reagent. Organic thioacids, such as mercaptoacetic acid, mercaptopropionic acid, mercaptobutyric acid, and the like, are similarly employable. Also operative in our reaction for the preparation of novel alpha-hydroxy-beta-mercapto-alkanals are such mercapto aromatic compounds as the mercaptobenzenes, including thiophenol, thiocresol, the thionaphthols, etc.

It can thus be seen that the radical X in the ring-opening reactant HX may be regarded as selected from the class of monovalent radicals consisting of RZ—,

HS— and halogens, where R is a hydrocarbyl radical, R' is a hydrocarbyl radical having one less carbon atom than R, and Z is a non-metallic chalcogen.

The compounds enumerated above have all been found to react with ethylene oxide so as to open the oxirane ring with accompanying substitution. However, since ethylene oxide is symmetrical, it cannot be predicted from that reaction what the nature of the substitution will be when these compounds are reacted with epoxyalkanals. We have unexpectedly found, however, that with the compounds of the type HX the products of the reaction with 2,3-epoxyalkanals are primarily alpha-hydroxy-beta-X-alkanals with only minor amounts of alpha-X-beta-hydroxyalkanals present. Thus, when hydrogen sulfide is reacted with 2,3-epoxypropanal, the product, obtained in excess of 90% yield, is alpha-hydroxy-beta-mercaptopropanal, while when hydrogen chloride is reacted with the same alkanal, a similar yield of alpha-hydroxy-beta-chloropropanal is obtained.

Best results are achieved when the reactants are used in stoichiometric proportions or proportions such that an excess of the HX reactant is employed. Under these conditions, the most efficient utilization is made of the 2,3-epoxyalkanal, and the beta-substituted alpha-hydroxyalkanal product is afforded in a reaction medium from which it is most readily recovered.

The reaction may be conducted under either aqueous or anhydrous conditions. Separation of the product from the reaction mixture is facilitated when anhydrous organic solvents are employed. Such solvents as chloroform, benzene, toluene, dioxane and other ethers, and similar conventional organic liquids which can be readily dried and distilled are suitable. In organic solvents, the products form readily removable insoluble dimers which can be recovered by filtration, etc.

While in most cases the reaction will take place at reasonable speeds upon addition of one reactant to the other, in some instances the use of catalysts may be desirable. The basis of the selection of an appropriate catalyst in any particular case is subject to fairly simple and obvious rules already known to organic chemists. Acidic substances, such as strong acid or acid-like materials may be used; these include acids such as sulfuric or phosphoric acid, and acid-like materials as, for example $BF_3$, $AlCl_3$, $SnCl_4$, $ZnCl_2$, etc. The latter class of catalysts are well known as acidic catalysts in Friedel Crafts reactions. Also useful are basic catalysts, including such alkali metal compounds as sodium phenate and sodium carbonate.

The reaction may be conducted at any temperature at which the reaction mixture is a liquid. However, at low temperatures the reaction rates are extremely slow and at high temperatures there is a risk that polymerization of the 2,3-epoxyalkanal reactant and/or the aldehyde product may take place. In general, temperatures from about 0° C. to about 50° C. are convenient, while temperatures from about 5° C. to about 30° C., that is, from about ten degrees above to about ten below room temperature, are preferred. We have found the reaction to be sufficiently exothermic that low starting temperatures are desirable.

Batchwise, semi-continuous, or continuous modes of practicing our process are equally suitable. While the normally gaseous reactants characterized by the designation HX, such as hydrogen chloride and hydrogen sulfide, may be added to the epoxyalkanal in gaseous form, it may also be convenient to dissolve them in the mutual reaction solvent and add that solution to the reaction mixture. The reaction proceeds satisfactorily in most cases at atmospheric pressure, but subatmospheric pressures may also be employed.

The products of our reaction are alkanals characterized by having a hydroxyl group attached to the carbon atom alpha to the formyl group and a monovalent substituent corresponding to the above characterization of X on the carbon atom beta to the formyl group. In general, these compounds may be shown by the structural formula

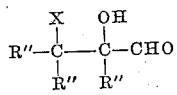

wherein R″ is selected from the group of monovalent radicals consisting of the hydrogen atom and lower alkyl radicals.

Thus, when R″ is hydrogen, the product alpha-hydroxy-beta-X-alkanals are lactaldehydes, and in cases where X is a halogen atom they are halolactaldehydes. Similarly, when X is a non-olefinic hydrocarbyloxy radical, as provided for in the definition of X, the lactaldehydes may be regarded as beta-ether lactaldehydes. Examples of such lactaldehydes when R is a monovalent hydrocarbon radical connected to the aldehyde residue through a divalent oxy bridge include beta-methoxylactaldehyde, beta-propoxylactaldehyde, beta-phenoxylactaldehyde, and beta-benzyloxylactaldehyde. Alternatively, when the X radical represents the radical HS—, a representative product is beta-mercaptolactaldehyde.

When, however, the X radical is an acyl or thioacyl radical, such as acetyl or thioacetyl, the resulting alpha-hydroxyalkanal is a beta-acetyl or beta-thioacetyl lactaldehyde.

The substituted alpha-hydroxyalkanal products of our invention, as exemplified by the lactaldehydes just discussed, may be recovered from the reaction mixture in a variety of ways well known to the skilled chemist. The solvent and excess reactant may frequently be separated from the product alkanal by distillation under reduced pressure, or by washing with suitable solvents in which the excess reactant is soluble but the product is not or by combinations of these methods. Another useful method for recovery of the product is the crystallization thereof from the reaction medium at low temperatures.

Certain of the specific embodiments of the described and claimed invention are illustrated in the following examples, but it should be understood that the invention is not to be limited thereby. In the examples, unless otherwise specified, the parts given are by weight.

*Example I.—Preparation of Beta-Chlorolactaldehyde*

To a stirred solution of 36 parts of anhydrous 2,3-epoxypropanal in 525 parts of chloroform held at 10–15° C. was slowly added over a period of 30 minutes 135 parts of cold ethereal hydrogen chloride. The temperature of the reaction mixture was lowered in an ice bath to 5° C. whereupon 32 parts of a white crystalline precipitate was deposited.

After separation, the precipitate was found to have a melting point of 136–137° C. at which it decomposed. Analysis thereof gave the following data:

|  | C | H | Cl | Carbonyl Value (eq./100g.) |
|---|---|---|---|---|
| Calculated for C₃H₅ClO₂ | 33.2 | 4.7 | 32.7 | 0.92 |
| Found | 33.2 | 4.7 | 32.3 | 0.92 |

The material was insoluble in hot water, hot chloroform and cold ethanol, and was therefore concluded to be the dimer of beta-chlorolactaldehyde. In aqueous solution the dimer reverts to monomer to give the carbonyl value noted.

The supernatant mother liquor from the crystals was concentrated to a volume of about 100 ml. and 13.3 parts of an ethereal solution containing 2.2 parts of hydrogen chloride were added with stirring. Upon cooling this mixture, another 22 parts of the white crystalline dimer, having the above properties, precipitated. In this way, a total of 54 parts, or a nearly quantitative yield, based on the starting 2,3-epoxypropanal, was recovered.

*Example II.—Preparation of Beta-Mercaptolactaldehyde*

To 14.4 parts of 2,3-epoxypropanal in 80 parts of acetone, held at 10–15° C., was added dropwise with stirring 800 parts of acetone saturated with hydrogen sulfide and containing 0.1 part of sodium carbonate.

After the addition was completed, the reaction mixture was stirred for 12 hours. A white crystalline precipitate present in the mixture was filtered, washed with water, and dried. In this way, 19.3 parts or a 94% yield of a product having a melting point of 100–102° C. was obtained. The product was determined to be beta-mercaptolactaldehyde. A carbon-hydrogen-sulfur analysis gave the following data:

|  | C | H | S |
|---|---|---|---|
| Calculated for C₃H₆O₂S | 34.2 | 5.7 | 29.3 |
| Found | 34.0 | 5.7 | 30.2 |

*Example III.—Preparation of Beta-Phenoxylactaldehyde*

To 56.4 parts of phenol in 180 parts of benzene was added 21.6 parts of 2,3-epoxypropanal in 90 parts of benzene. To this mixture was added 2 cc. of pyridine, and the mixture was heated to reflux (85° C.). After two hours the reaction mixture was cooled and filtered, and the solid so recovered dried under vacuum. Analysis thereof gave the following data, corresponding to beta-phenoxylacetaldehyde:

|  | C | H |
|---|---|---|
| Calculated for C₉H₁₀O₃ | 65.1 | 6.03 |
| Found | 64.9 | 5.9 |

*Example IV.—Preparation of Beta-Acetoxylactaldehyde*

Eighteen parts of 2,3-epoxypropanal and 70 parts of glacial acetic acid were refluxed together for 24 hours. At the end of that time, the unreacted ingredients were removed by distillation at atmospheric pressure, and the product purified by distillation at 114–115° C. at 1 mm. Hg. In this way 14 parts of a product identified as beta-acetoxylactaldehyde were obtained. The compound had a melting point of 115–116° C.

Example V.—Preparation of Beta-Ethoxylactaldehyde

To a round-bottom flask were added 18 parts of 2,3-epoxypropanal, 46 parts of ethanol and 0.1 part of $SnCl_4$, and the mixture was refluxed for about 20 minutes. Most of the unreacted alcohol was then removed under reduced pressure and 100 parts of water were added to the residue. The resulting solution was made alkaline with sodium carbonate and saturated with sodium chloride. It was then extracted with ether, and the ethereal solution so obtained dried over anhydrous magnesium sulfate. The ether was then evaporated off and the product distilled. Twenty and four-tenths parts of material having a boiling point from 40–110° C. at 5–10 mm. of mercury were obtained in this manner.

This product was repeatedly distilled through a small Vigreaux column until a fraction coming over at 85–86° at 16 mm. was obtained which hardened to a white solid. This material was washed with ethanol, leaving a substance having a melting point of 137–138° C. Analysis thereof gave the following data:

|  | C | H | Carbonyl Value (eq./100 g.) |
|---|---|---|---|
| Calculated for $C_5H_{10}O_3$ | 50.8 | 8.4 | 0.847 |
| Found | 50.6 | 8.4 | 0.852 |

In this way, it was determined that a yield of about 75% was obtained.

Example VI.—Preparation of Beta-Thioacetoxy Lactaldehyde

To a reaction flask fitted with a stirrer, condenser, dropping funnel and thermometer were added 100 parts of thioacetic acid, 160 parts acetone and 0.1 part sodium carbonate. To this mixture, one-half of a solution of 14.4 parts of 2,3-epoxypropanal in 80 parts of acetone was added dropwise with vigorous stirring, and the mixture was heated to reflux at 25–27° C. The remainder of the aldehyde solution was added over a period of one and one-half hours.

The reaction mixture was refluxed for an additional three hours and was stirred without heating for about sixteen hours more. The solvent and excess acid were then stripped off under reduced pressure, leaving 31.2 parts of residue. Analysis thereof gave the following data from which it was determined that the product was beta-thioacetoxy lactaldehyde:

|  | C | H | S |
|---|---|---|---|
| Calculated for $C_5H_7O_3S$ | 40.0 | 6.66 | 21.4 |
| Found | 38.1 | 5.2 | 29.1 |

Example VII.—Preparation of the Beta-(O,O-Dimethylphosphorodithioate) of Lactaldehyde To a benzene solution of 2,3-epoxypropanal was added dropwise over a two-hour period a 50% benzene solution containing an approximately equimolar amount of O,O-dimethylphosphorodithioic acid. The resulting mixture was refluxed at about 80° C. for about two hours, at which time there separated out a white crystalline solid. This substance, when recovered, proved to be the dimer or lactaldehyde,beta-(O,O-dimethylphosphorodithioate), obtained in about 20% yield. The solid had a melting point of 98–101° C.

We claim as our invention:

1. The alpha-hydroxy beta-mercaptoalkanal of the structure

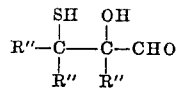

where R'' is selected from the group of monovalent radicals consisting of hydrogen and lower alkyl.

2. The alpha-hydroxy-beta-mercaptoalkanal having up to 8 carbon atoms.

3. Beta-mercaptolactaldehyde.

References Cited in the file of this patent

UNITED STATES PATENTS

| 2,286,037 | Loder | June 9, 1942 |
| 2,743,276 | Anderson | Apr. 24, 1956 |
| 2,887,498 | Hearne et al. | May 19, 1959 |

FOREIGN PATENTS

| 542,380 | Great Britain | Jan. 7, 1942 |

OTHER REFERENCES

Beilstein: Band I (Bis 1910), Berlin (1918), p. 820.
Fischer et al.: C.A., vol. 24 (1930), page 5025.
Union Carbide Pamphlet, Peracetic Acid and Derivatives (1957), pp. 18–27, 40 and 41 relied on.